June 19, 1928. 1,674,296

W. PETERS ET AL

SHIPPING AND STORING RECEPTACLE

Filed Sept. 11, 1926

Inventors:
Wilhelm Peters, Otto Stier
and Traugott Kalinowsky
by Cooke, Uhlenbeck & Farley
Attorneys Patented June 19, 1928.

1,674,296

UNITED STATES PATENT OFFICE.

WILHELM PETERS, OF ST. JOSE, COSTA RICA, AND OTTO STIER AND TRAUGOTT KALINOWSKY, OF HEIDELBERG, GERMANY.

SHIPPING AND STORING RECEPTACLE.

Application filed September 11, 1926, Serial No. 134,837, and in Germany July 28, 1926.

Our invention relates to improvements in shipping and storing receptacles and more particularly in receptacles for shipping any kind of goods to tropic and other foreign countries. The object of the improvements is to provide a receptacle which after being used for shipping the goods can be used either as a receptacle for storing goods or for other purposes. With this object in view our invention consists in constructing the receptacle from a material which is not affected by atmospheric or other influences, and which is not destroyed by animals such as rats, termites and the like. For this reason our invention consists in constructing the receptacle from reinforced concrete provided with bracing rings protecting the outer face of the receptacle when rolling the same. Preferably, the receptacle is provided at its top and bottom with rings having angular or hook shaped cross-sections and adapted to have the hooks or the chains of hoisting machines attached thereto. After being shipped abroad and emptied, the receptacle may be used either as a vessel for storing liquids and the like, or, after removing the lid and the bottom, the cylindrical walls of several receptacles may be placed one above the other for making a high receptacle, a stack, a pipe, and the like.

Figure 3:
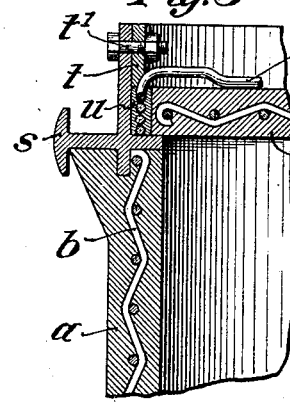
Figure 4:
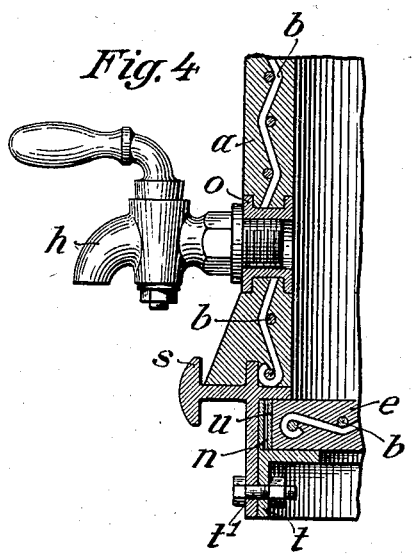
Figure 6:
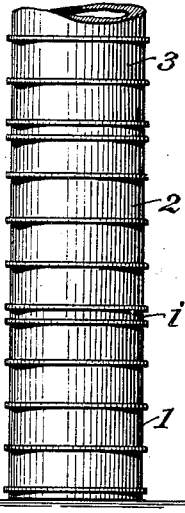
Figure 5:
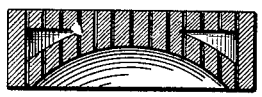

For the purpose of explaining the invention an example embodying the same has been shown in the accompanying drawing, in which the same letters of reference have been used in all the views to indicate corresponding parts. In said drawing, Fig. 1, is a sectional elevation showing the receptacle, Figs. 2 to 4, are detail sectional views showing certain parts of the receptacle, Fig. 5, is a sectional elevation showing a filtering member, and Fig. 6, is an elevation showing a comparatively high vessel constructed from a plurality of superposed cylindrical walls made from receptacles by having the tops and bottoms removed therefrom.

Figure 1:
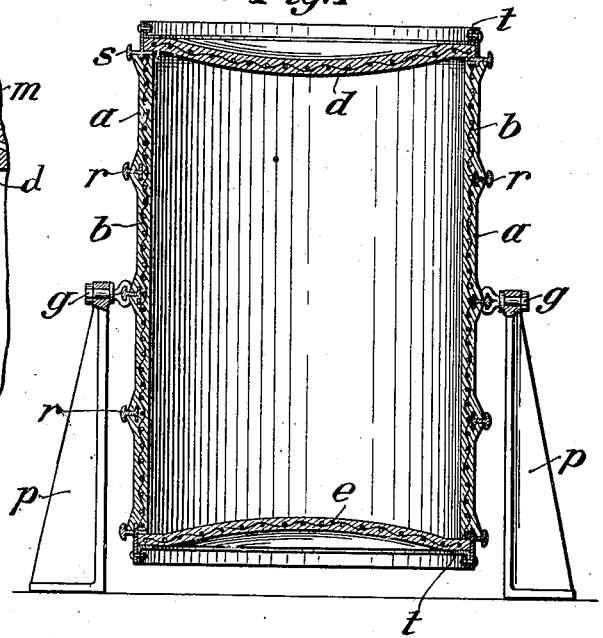
Figure 2:
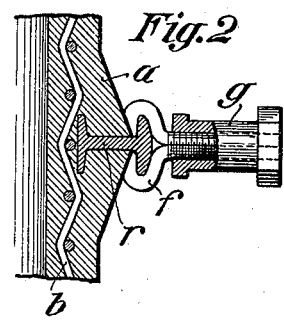

In the example shown in Fig. 1, the receptacle which is made from reinforced concrete or other coalescent material comprises a wall $a$ which is either cylindrical or slightly tapering. As shown the concrete is reinforced by wire in the form of net work, and it is further braced by a plurality of metal rings $r$ distributed over the length of the wall and projecting beyond the same so as to provide bearing surfaces on which the receptacle may be rolled. At its top and bottom the wall $a$ has rings $s$ of angular or hook shaped cross-section secured thereto. In the construction shown in Figs. 3 and 4 the said rings have angular cross-sections, and they are formed with inwardly projecting flanges. The object of the rings $s$ is, first, to reinforce the ends of the cylindrical wall and, second, to provide means for attaching the hooks of crane chains thereto.

The lid $d$ and the bottom $e$ of the receptacle are likewise made from reinforced concrete, and they are constructed so that they can be readily removed from the cylindrical wall. As is best shown in Figs. 3 and 4, the said lid and bottom are fixed within the reinforcing rings $s$ by means of annular angle irons $t$ fixed internally to the outwardly projecting flanges of the rings $s$ by means of screws $t^1$. In both constructions the lid and bottom fit loosely within the rings $s$, and, as shown in Fig. 3, they are fixed in position by means of a helical wire $m$ put into the annular space between the lid $d$ and the ring $s$ and cement or gypsum $u$ poured into the said space. In the modification shown in Fig. 4, a ring $n$ of flat iron is placed into the said space and fixed in position by means of cement or gypsum. Thus, after the said filling of cement or gypsum has set the lid or bottom is in rigid connection with the cylindrical wall. If it is desired to use the cylindrical wall of the receptacle for other purpose, the rings $t$ are removed, and the fillings $m$, $u$ and $n$, $u$ are broken, whereupon the lid $d$ or bottom $e$ can be readily removed.

When it is desired to use the shipping receptacle for storing fruit or water, we provide the same at opposite sides of its cylindrical wall with trunnions $g$. In the example shown in Fig. 2, the said trunnions are in the form of internally screw-threaded sleeves $g$ screwing on the shaft of a hook shaped member $f$ engaging the outer flange of one of the rings $r$; the shaft of the member $f$ being preferably made in two sections clamped together by screwing the sleeve $g$ thereon. By means of the trunnions $g$ the receptacle may be rockingly supported on standards $p$, so that the receptacle can be readily filled and emptied.

In Fig. 5 we have shown a filter $z$ the dimension of which is such that it may be placed into the receptacle above the bottom e thereof, so that the receptacle can be used for filtering water. As shown, the filter z is formed with a concave bottom, and immediately above the bottom e of the receptacle a faucet h is screwed into a lining o provided in the wall a. While using the receptacle for shipping the lining o is closed by means of a screw plug. The lid d may be provided with an inlet opening for filling water or other matter into the same. The said inlet opening may also be used for passing a disinfecting medium such as sulphocarbon into the receptacle.

Preferably the inner wall of the receptacle is coated with a suitable glaze or varnish preventing the goods contained within the receptacle from sticking to the wall thereof.

In Fig. 6 we have shown an example in which a plurality of receptacles are combined to form a comparatively high receptacle or a pipe. Preferably the wall a of the receptacle is slightly tapering. The rings s provided at the top and bottom of the receptacle are different in diameter. In the example shown in Fig. 6 three receptacles 1, 2, 3 have been combined into a single receptacle, the ring s provided at the top end of the receptacle 1 and the ring s provided at the bottom end of the receptacle 2 being in telescoping engagement with each other, and the rings s provided respectively at the top and bottom of the receptacles 2 and 3 being likewise in telescoping engagement with each other. In the figure the joints of the superposed receptacles have been indicated by the letter i. The receptacle shown in Fig. 1 may be used as a water tank, a stack and the like, and further, it may be used in horizontal or inclined position as a pipe for conducting the water of small rivulets, or as a pipe in a water supply system. The rings s may be jointed by means of screw connections, and when using the set of receptacles as a stack, bracing rods may be secured thereto. Further the iron rings r, s projecting from the body of the receptacle may be coated with concrete in order to prevent rusting.

After removing the lid a closet-seat may be placed on the receptacle.

The receptacle may also be made from cellulose, paper material or other fibre material reinforced with iron and, if desired, impregnated with suitable media.

We claim:

1. The herein described receptacle comprising a body of reinforced coalescent material, and bracing rings encircling said body and having portions embedded therein and other portions projecting outwardly from said body.

2. The herein described receptacle, which consists of a side wall made from reinforced concrete, rings secured to and projecting from the ends of said wall, tops and bottoms loosely fitting in said rings, and filling matter located within the spaces between said rings and the top and bottom and fixed in position by a suitable cement.

3. The herein described receptacle, which consists of a side wall made from reinforced concrete, rings secured to and projecting from the ends of said wall, tops and bottoms loosely fitting in said rings, filling matter located within the spaces between said rings and the top and bottom and fixed in position by a suitable cement, and rings internally fixed to said first named rings and engaging said top and bottom for holding the same in position.

4. The herein described receptacle, comprising a body made from reinforced concrete, rings fixed to and projecting from the ends of said body, the outer diameter of one of said rings being smaller than the inner diameter of the other ring, so that receptacles of like construction may be combined with their rings in telescoping engagement, and a lid and bottom at opposite ends of said body respectively, removably connected with said rings.

5. The herein described apparatus, comprising a plurality of cylindrical members connected with each other at their ends and each comprising a cylindrical body made from reinforced concrete, rings fixed to and projecting from the ends of said body, the outer diameter of one of said rings being smaller than the inner diameter of the other ring, the adjacent rings of the combined receptacles being in telescoping engagement with each other and suitably connected with each other, and lids and bottoms at opposite ends of said bodies respectively, removably connected with said rings, and removable prior to the telescopic engagement of the rings of contiguous receptacles.

In testimony whereof we hereunto affix our signatures.

WILHELM PETERS.
OTTO STIER.
TRAUGOTT KALINOWSKY.